(12) United States Patent
Tse et al.

(10) Patent No.: US 10,673,957 B2
(45) Date of Patent: Jun. 2, 2020

(54) PROVIDING HIGH AVAILABILITY IN A SOFTWARE DEFINED NETWORK

(71) Applicant: AT&T Intellectual Property I, L.P., Atlanta, GA (US)

(72) Inventors: Simon Tse, Holmdel, NJ (US); Alvin Goddard, Kendall Park, NJ (US); Catherine Ferraro, Howell, NJ (US); Gagan Choudhury, Jackson, NJ (US); Narayan Padi, Cedar Knolls, NJ (US); Lynn Rivera, Leesburg, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/021,363

(22) Filed: Jun. 28, 2018

(65) Prior Publication Data
US 2020/0007629 A1  Jan. 2, 2020

(51) Int. Cl.
| H04L 29/08 | (2006.01) |
| H04L 12/26 | (2006.01) |
| H04L 12/717 | (2013.01) |
| H04L 12/54 | (2013.01) |
| H04L 12/70 | (2013.01) |
| H04L 12/24 | (2006.01) |

(52) U.S. Cl.
CPC ........ *H04L 67/145* (2013.01); *H04L 12/5601* (2013.01); *H04L 43/0817* (2013.01); *H04L 43/10* (2013.01); *H04L 45/42* (2013.01); *H04L 41/0893* (2013.01); *H04L 41/12* (2013.01); *H04L 2012/5627* (2013.01)

(58) Field of Classification Search
USPC ................ 709/224, 225, 223, 228, 203, 242
See application file for complete search history.

(56) References Cited

U.S. PATENT DOCUMENTS

| 6,779,039 | B1 * | 8/2004 | Bommareddy ... H04L 29/12009 |
| | | | 709/226 |
| 9,264,301 | B1 | 2/2016 | Chua et al. |
| 9,270,612 | B2 | 2/2016 | DeCusatis et al. |
| 9,667,524 | B2 | 5/2017 | Gorkemli et al. |
| 9,813,286 | B2 | 11/2017 | Fang et al. |
| 9,906,451 | B2 | 2/2018 | DeCusatis et al. |
| 2011/0225311 | A1 * | 9/2011 | Liu ...................... H04L 45/125 |
| | | | 709/231 |

(Continued)

FOREIGN PATENT DOCUMENTS

| CN | 106953744 | 7/2017 |
| WO | WO 2015195151 | 12/2015 |

*Primary Examiner* — Jude Jean Gilles (57) ABSTRACT

In one example, a method for monitoring the state and health of a centralized software defined networking controller includes detecting, by a standby software defined networking controller, when a number of path computation client sessions reported by an active software defined networking controller fails to match an expected number; verifying, by the standby software defined networking controller after expiration of a predefined delay implemented after the detecting, that the number of path computation client sessions reported by the active software defined networking controller still fails to match the expected number; and assuming, by the standby software defined networking controller after the verifying, a role of the active software defined networking controller.

20 Claims, 6 Drawing Sheets

(56) References Cited

U.S. PATENT DOCUMENTS

| | | | |
|---|---|---|---|
| 2011/0225312 A1* | 9/2011 | Liu | H04L 12/18 |
| | | | 709/231 |
| 2012/0185907 A1* | 7/2012 | Park | H04N 21/236 |
| | | | 725/110 |
| 2013/0194914 A1* | 8/2013 | Agarwal | H04L 45/245 |
| | | | 370/225 |
| 2014/0269314 A1* | 9/2014 | Ozer | H04L 47/25 |
| | | | 370/235 |
| 2015/0249643 A1* | 9/2015 | Floyd, III | H04L 63/20 |
| | | | 726/13 |
| 2016/0205518 A1* | 7/2016 | Patel | H04L 65/1073 |
| | | | 455/518 |
| 2016/0205519 A1* | 7/2016 | Patel | H04L 67/1002 |
| | | | 455/518 |
| 2017/0070479 A1* | 3/2017 | Menezes | H04L 63/04 |
| 2017/0099217 A1 | 4/2017 | Li et al. | |
| 2017/0288947 A1 | 10/2017 | Kaniampadv Sebastian et al. | |

* cited by examiner

| PCE HOST NAME | STATE | PCE STATE | BGP STATE | PRECEDENCE | PCC PRECEDENCE | FAILOVER IN PROGRESS | PCC SESSION COUNT | DELEGATED COUNT | UPDATE PCE | UPDATE BGP |
|---|---|---|---|---|---|---|---|---|---|---|
| ODL1 | ACTIVE | UP | UP | PRIMARY | 10 | FALSE | [0-50] | [0-4,900] | [TIME] | [TIME] |
| ODL2 | STANDBY | UP | UP | SECONDARY | 20 | FALSE | [0-50] | [0-4,900] | [TIME] | [TIME] |
| ... | | | | | | | | | | |
| ODLn | STANDBY | UP | UP | SECONDARY | 30 | FALSE | [0-50] | [0-4,900] | [TIME] | [TIME] |

| PCEP DIFFERENCE (% DIFFERENCE) | PCEP DIFFERENCE (ABSOLUTE DIFFERENCE) | NUMBER OF DELAY CYCLES (30 s/CYCLE) |
|---|---|---|
| 5 | 1 | 10 (300s) |
| 20 | 10 | 6 (180s) |
| >50 | 25+ | 0 (0s) |

FIG. 6 ured number; and assuming, after the veri-
fying, a role of the active software defined networking
controller.

PROVIDING HIGH AVAILABILITY IN A SOFTWARE DEFINED NETWORK

The present disclosure relates generally to software defined networks, and relates more particularly to devices, computer-readable media, and methods for monitoring the state and health of a centralized software defined network controller to promote high availability.

BACKGROUND

Cloud computing is an information technology (IT) paradigm that achieves coherence and scalability through the sharing of computing resources. One specific approach to cloud computing is software defined networking (SDN), which consolidates the network intelligence in a centralized network component. This is accomplished by decoupling the data plane (i.e., the data packet forwarding process) and the control plane (i.e., the packet routing process), and implementing the control plane in an SDN controller that is directly programmable. The SDN controller manages the network, with multiple connections to the physical, logical, and virtual resources.

In some SDN implementations, secondary SDN controller(s) may be deployed to serve as a backup in the event of a failure of the primary SDN controller.

SUMMARY

In one example, a method for monitoring the state and health of a centralized software defined networking controller includes detecting, by a standby software defined networking controller, when a number of path computation client sessions reported by an active software defined networking controller fails to match an expected number; verifying, by the standby software defined networking controller after expiration of a predefined delay implemented after the detecting, that the number of path computation client sessions reported by the active software defined networking controller still fails to match the expected number; and assuming, by the standby software defined networking controller after the verifying, a role of the active software defined networking controller.

In another example, a non-transitory computer-readable medium stores instructions which, when executed by a processor of a standby software defined networking controller, cause the processor to perform operations. The operations include detecting when a number of path computation client sessions reported by an active software defined networking controller fails to match an expected number, verifying; after expiration of a predefined delay implemented after the detecting, that the number of path computation client sessions reported by the active software defined networking controller still fails to match the expected number; and assuming, after the verifying, a role of the active software defined networking controller.

In another example, a device includes a processor and a computer-readable medium storing instructions which, when executed by the processor, cause the processor to perform operations. The operations include detecting when a number of path computation client sessions reported by an active software defined networking controller fails to match an expected number; verifying, after expiration of a predefined delay implemented after the detecting, that the number of path computation client sessions reported by the active software defined networking controller still fails to

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Examples of the present disclosure provide devices, computer-readable media, and methods for monitoring the state and health of a centralized (e.g., primary) software defined networking (SDN) controller to promote high availability. As discussed above, in some SDN implementations, a secondary SDN controller may be deployed to serve as a backup in the event of a failure of the primary SDN controller. In such an event, it may be necessary to initiate a failover from the primary SDN controller to the secondary SDN controller, such that the secondary SDN controller assumes the role of the primary SDN controller, including assuming all of the primary SDN controller's connections to the physical, logical, and virtual resources. However, if the primary and secondary SDN controllers do not act in a sufficiently coordinated fashion to carry out the failover, network connectivity, functionality, and/or data may be lost.

Examples of the present disclosure automatically monitor the health of a primary SDN controller and at least one secondary SDN controller, where the health is a function of a controller's reachability and responsiveness. In particular, the primary SDN controller monitors the secondary SDN controller, while the secondary SDN controller monitors the primary SDN controller. In the event that the health of the primary SDN controller is poor (e.g., as determined by a failure to meet certain health-related criteria), control of the network is automatically transitioned to the secondary SDN controller (i.e., the secondary SDN controller assumes the role of the primary SDN controller). The transition process coordinates actions between the primary SDN controller and the secondary SDN controller to minimize the loss of network connectivity, functionality, and/or data. Thus, examples of the present disclosure enable the selection of a managing SDN controller to be made in an intelligent manner that ensures synchronization of the network to the healthiest available SDN controller. Further examples of the present disclosure may dynamically instantiate new secondary SDN controllers to help control the network.

Figure 1:
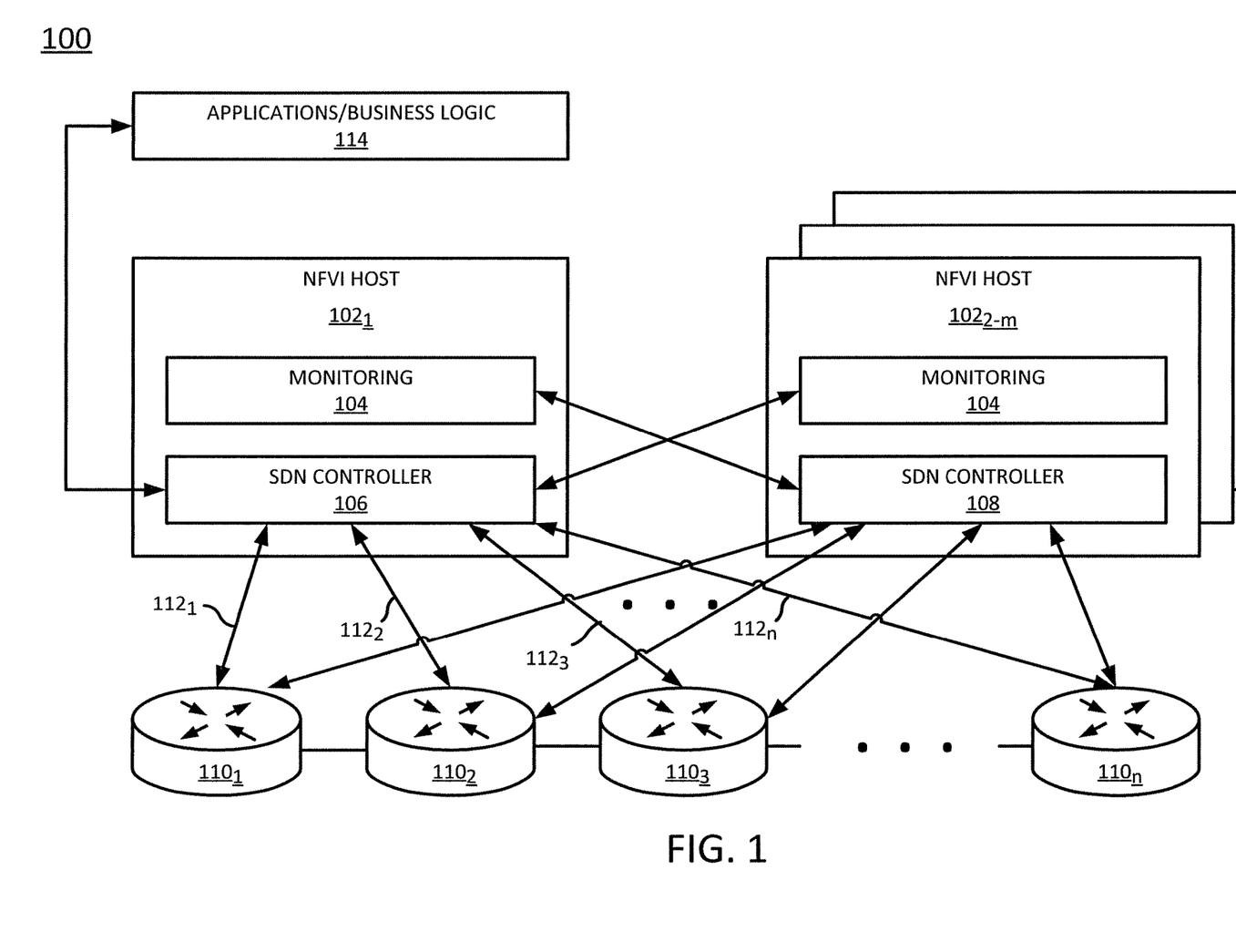
FIG. 1 illustrates a block diagram depicting a portion of an example of a network or system suitable for performing or enabling the steps, functions, operations, and/or features described herein.

To aid in understanding the present disclosure, FIG. 1 illustrates a block diagram depicting a portion of an example of a network or system 100 suitable for performing or enabling the steps, functions, operations, and/or features described herein. The overall communications system 100 may include any number of interconnected networks which may use the same or different communication technologies. In this case, the portion of the network 100 illustrated in FIG. 1 may comprise portions of a core telecommunications network. The core telecommunications network may comprise a backbone network, or transport network, such as an Internet Protocol (IP)/multi-protocol label switching (MPLS) network, where label switched routers (LSRs) can be assigned for routing Transmission Control Protocol (TCP)/IP packets, User Datagram Protocol (UDP)/IP packets, and other types of protocol data units (PDUs) (broadly "traffic"). In other examples, the core telecommunications network may comprise a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, or another type of telecommunications network. In one example, the core telecommunications network uses network function virtualization infrastructure (NFVI), e.g., servers in a data center or data centers that are available as host devices to host virtual machines (VMs) comprising virtual network functions (VNFs). In other words, at least a portion of the core telecommunications network may incorporate software-defined network (SDN) components.

In one embodiment, the network 100 may also include one or more other networks that are in communication with the core telecommunications network. For instance, the network 100 may further include a wireless network (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, and/or the like. The other networks may be controlled or operated by a same entity as that of the core telecommunications network or may be controlled or operated by one or more different entities.

As mentioned above, various components of network 100 may comprise virtual network functions (VNFs) which may physically comprise hardware executing computer-readable/computer-executable instructions, code, and/or programs to perform various functions. To this end, in one example, the network 100 may include a plurality of network function virtualization infrastructure (NFVI) hosts $102_1$-$102_m$ (hereinafter individually referred to as an "NFVI host 102" or collectively referred to as "NFVI hosts 102") which are configurable to perform a broad variety of network functions and services. For example, NFVI hosts 102 may comprise shared hardware, e.g., one or more host devices comprising line cards, central processing units (CPUs), or processors, memories to hold computer-readable/computer-executable instructions, code, and/or programs, and so forth. In this way, an NFVI host 102 may include hardware and/or software configured, depending on its connections, to function as a firewall, a media server, a Simple Network Management protocol (SNMP) trap, a virtual provider edge (VPE) router, a serving gateway (SGW), a mobility management entity (MME), a call control element (CCE), a domain name service (DNS) server, a packet data network gateway (PGW), a gateway mobile switching center (GMSC), a short message service center (SMSC), or another type of network element.

In the example illustrated in FIG. 1, the NFVI hosts 102 are configured to host a plurality of software defined networking (SDN) controllers, including a primary SDN controller 106 and at least one secondary SDN controller 108. The primary SDN controller 106 serves as the control layer of a software defined network. In one example, the primary SDN controller 106 manages flow control to the infrastructure layer of the software defined network, e.g., by provisioning and releasing instantiations of virtual network functions (VNFs) to perform the functions of routers, switches, and other devices $110_1$-$110_n$ (hereinafter individually referred to as a "device 110" or collectively referred to as "devices 110") in the infrastructure layer, by provisioning routing tables and other operating parameters for the VNFs, and so forth. In one example, the primary SDN controller 106 may maintain communications with VNFs via a number of control links $112_1$-$112_n$ (hereinafter individually referred to as a "control link 112" or collectively referred to as "control links 112"), which may comprise secure tunnels (e.g., label switched paths) for signaling communications over an underlying Internet Protocol (IP) infrastructure of the network 100. In other words, the control links may comprise virtual links multiplexed with transmission traffic and other data traversing the network 100 and carried over a shared set of physical links.

The primary SDN controller 106 may also manage flow control to an application layer of the software defined network, i.e., to a plurality of applications and/or business logic 114.

Figure 6:
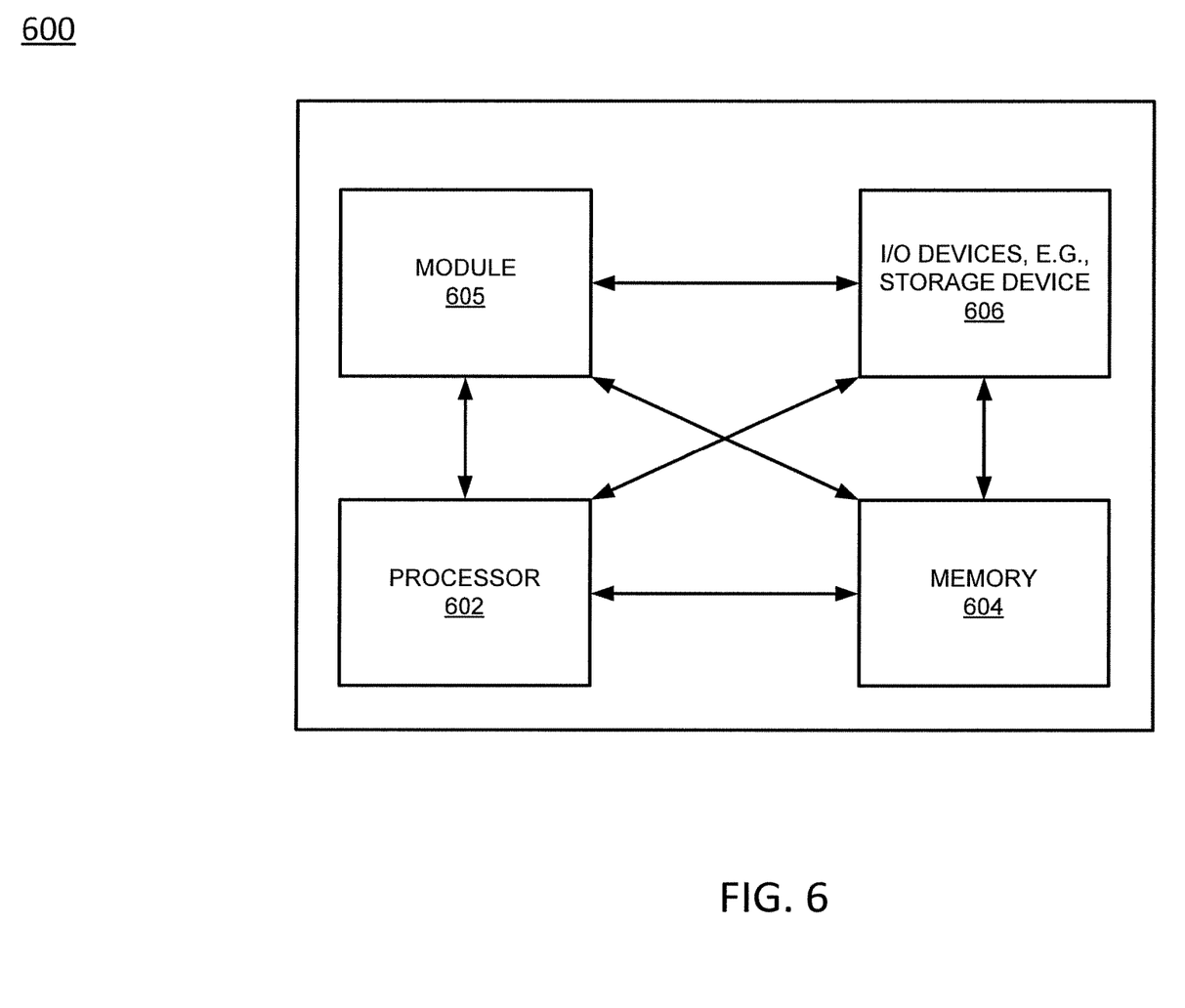
FIG. 6 illustrates an example high-level block diagram of a computer specifically programmed to perform the steps, functions, blocks, and/or operations described herein.

In one example, the primary SDN controller 106 may comprise a computing system or server, such as computing system 600 depicted in FIG. 6, and may be configured to provide one or more operations or functions in accordance with the present disclosure. For example, the functions of the primary SDN controller 106 may include monitoring the state or health of the secondary SDN controller 108, as discussed in further detail below.

The secondary SDN controller 108 may serve as a backup to the primary SDN controller 106 and may thus be configured in a manner similar to the primary SDN controller 106. In this case, the functions of the secondary SDN controller 108 may include monitoring the state or health of the primary SDN controller 106, as discussed in further detail below. Moreover, in the event of a failure of the primary SDN controller 106, the network 100 may "failover" to the secondary SDN controller 108. This promotes high availability of the network 100.

In one example, primary and secondary SDN controllers 106 and 108 may physically reside on the same NFVI host 102. In another example, primary and secondary SDN controllers 106 and 108 may reside on different NFVI hosts 102, as illustrated in FIG. 1. In a further example, primary and/or secondary SDN controllers 106 and 108 may have functions that are distributed over a plurality of NFVI hosts 102.

The NFVI hosts 102 may be further configured to host a monitoring application 104 that allows the primary and secondary SDN controllers 106 and 108 to continuously monitor each other's state and health and to initiate a failover in the event of a failure of the primary SDN controller 106. For instance, the NFVI host $102_1$ hosting the primary SDN controller 106 may monitor the state of the secondary SDN controller 108 hosted on the NFVI host $102_2$. Simultaneously, the NFVI host $102_2$ hosting the secondary SDN controller 108 may monitor the state of the primary SDN controller 106 hosted on the NFVI host $102_1$. The operations of the monitoring application are discussed in greater detail with respect to FIGS. 2-5.

It should be noted that the system 100 has been simplified. In other words, the system 100 may be implemented in a different form than that illustrated in FIG. 1. For example, the system 100 may be expanded to include additional networks and additional network elements, such as border elements, routers, switches, policy servers, security devices, gateways, a content distribution network (CDN) and the like, without altering the scope of the present disclosure. These network elements may also be physical or virtual. In addition, the system 100 may be altered to omit various elements, substitute elements for devices that perform the same or similar functions and/or combine elements that are illustrated as separate devices. For example, as discussed above, the primary SDN controller 106 and the secondary SDN controller 108 may be integrated into a single NFVI host 102. In still another example, the primary SDN controller 106 and/or the secondary SDN controller 108 may comprise functions that are spread across several NFVI hosts 102 (e.g., over different physical hardware devices and/or over different geographical locations and so on). Thus, these and other modifications of the system 100 are all contemplated within the scope of the present disclosure.

As used herein, the terms "configured" and "reconfigured" may refer to programming or loading a computing device with computer-readable/computer-executable instructions, code, and/or programs, e.g., in a memory, which when executed by a processor of the computing device, may cause the computing device to perform various functions.

Figure 2:
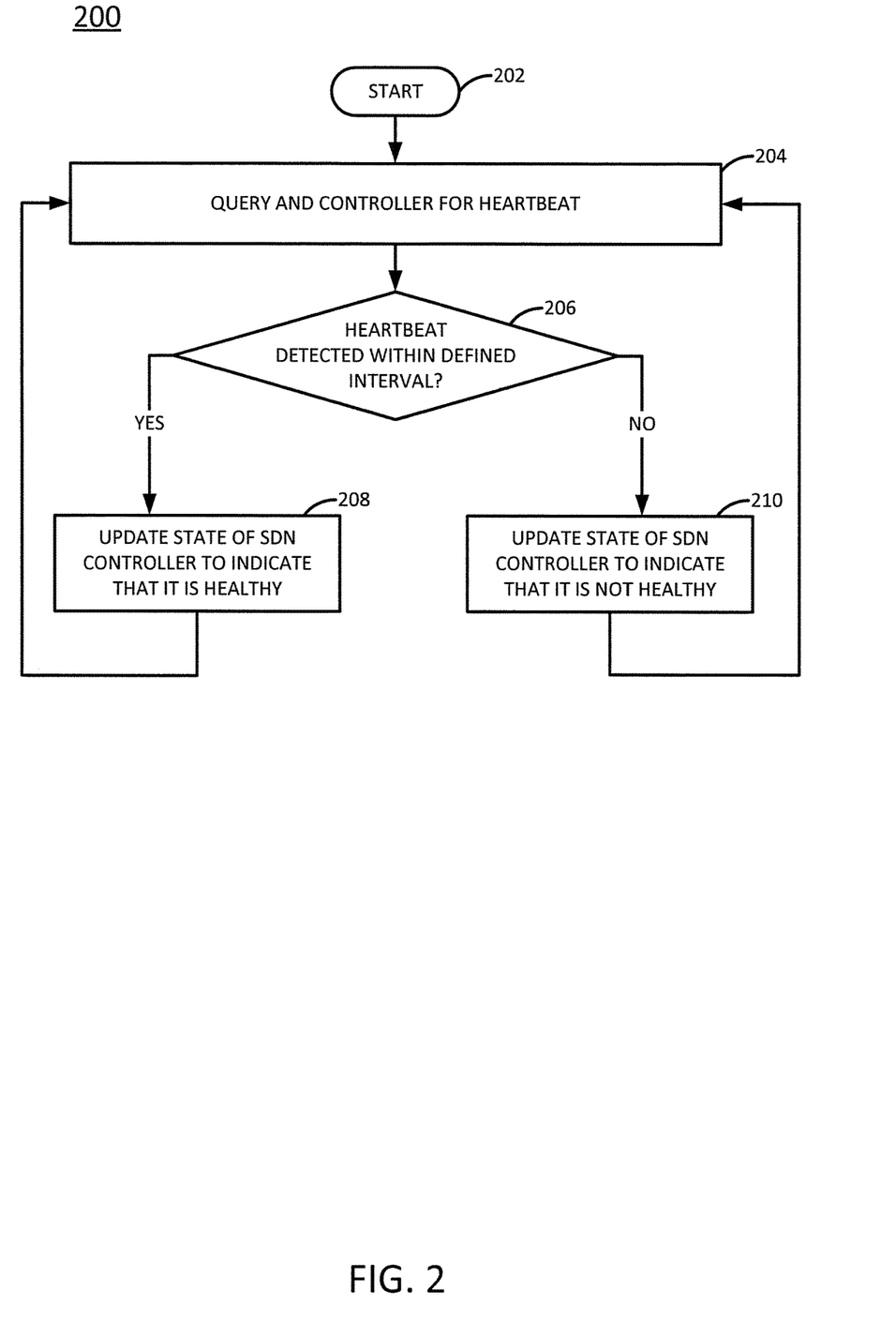
FIG. 2 illustrates a flowchart of an example method for monitoring the state and health of a centralized software defined networking controller to promote high availability, in accordance with the present disclosure.

FIG. 2 illustrates a flowchart of an example method 200 for monitoring the state and health of a centralized software defined networking (SDN) controller to promote high availability, in accordance with the present disclosure. In one example, the steps, functions, or operations of the method 200 may be performed by an SDN controller, e.g., broadly a "device," or by an algorithm running on an NFVI host that hosts an SDN controller, such as any of the NFVI hosts 102 in FIG. 1. Alternatively, or in addition, in one example, the steps, functions, or operations of method 200 may be performed by a computing device or system 600, and/or processor 602 as described in connection with FIG. 6 below. For example, the processor 602 and memory 604 may represent the hardware logic and a memory storing computer/hardware logic-executable instructions of an example server, in accordance with the present disclosure.

Figure 3:
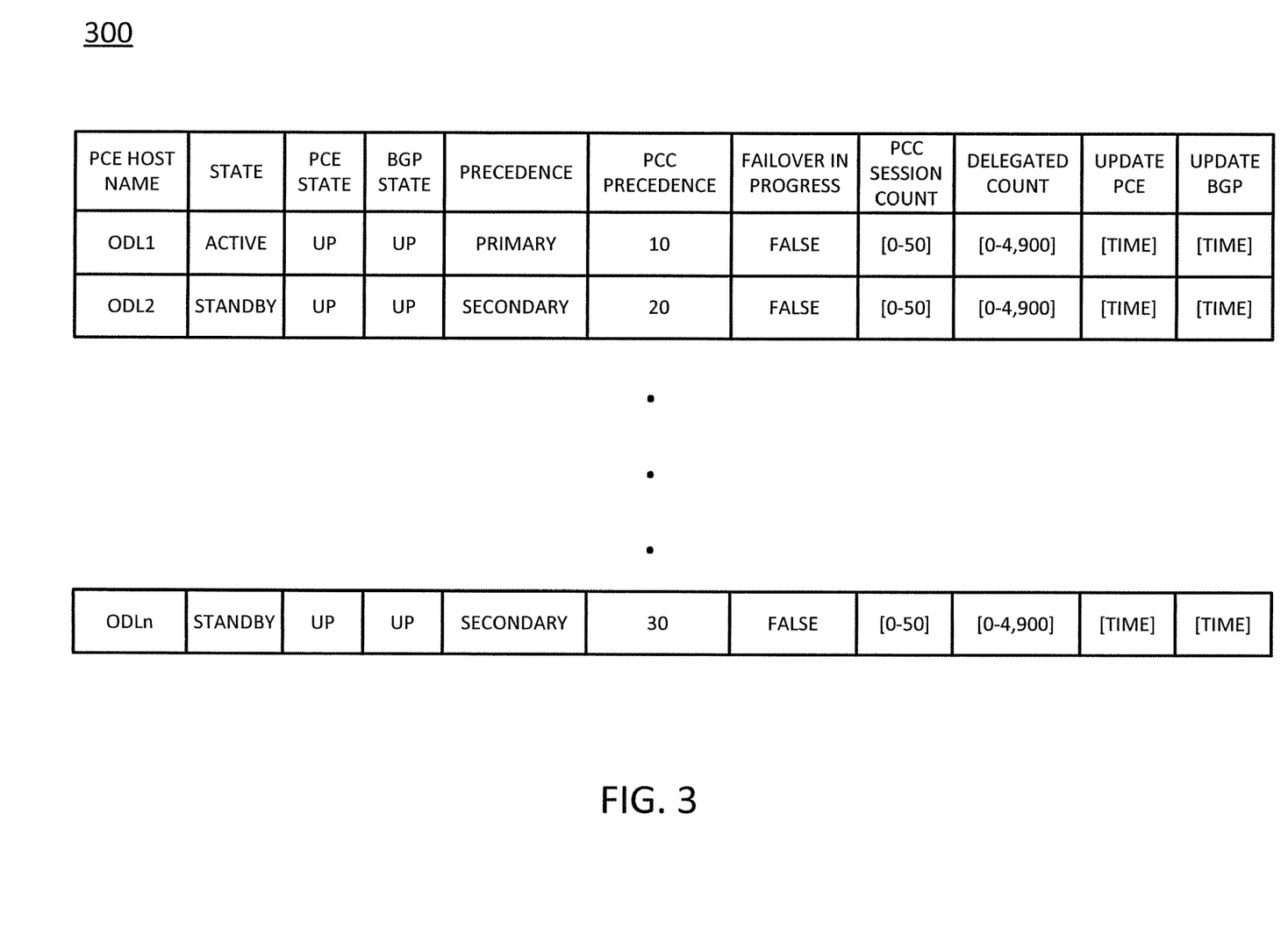
FIG. 3 illustrates one example of a table for tracking an software defined networking controller's path computation element state and border gateway protocol state.

For illustrative purposes, the method 200 is described in greater detail below in connection with a monitoring algorithm executing on a first NFVI host that hosts a first SDN controller, where the monitoring algorithm monitors a second SDN controller (which may or may not be hosted on a second NFVI host). However, references to "first" and "second" SDN controllers are made for ease of understanding, and are not meant to limit the number of SDN controllers that may be present and/or running the monitoring algorithm. For instance, as illustrated in FIG. 3, n SDN controllers may be present and running the monitoring algorithm.

The first SDN controller may be the primary and active SDN controller of FIG. 1, while the second SDN controller is a secondary and standby SDN controller of FIG. 1. Alternatively, the first SDN controller could be a secondary and standby SDN controller, while the second SDN controller is the primary and active SDN controller. As discussed above, the primary and secondary controllers will simultaneously monitor each other (or, more accurately, the NFVI host(s) hosting the SDN controllers will run algorithms to monitor the other SDN controller) by performing the method 200.

The method 200 begins in step 202 and proceeds to step 204. In step 204, the method queries the second SDN controller for a "heartbeat," e.g., by sending a message that requests a response. In one example, the heartbeat comprises a signal or response message from the second SDN controller. The response message may indicate a path computation element (PCE) state and/or a border gateway protocol (BGP) state of the second SDN controller and may contain other data indicative of the health or state of the second SDN controller. The method may query the second SDN controller for the heartbeat according to a defined schedule (e.g., every "x" seconds, where "x" can be 300, 120, 60, 30, 15, 10 and so on). In this way, the first SDN controller (or, more accurately, the NFVI host hosting the first SDN controller) is able to monitor the health of the second SDN controller.

Accordingly, in step 206, the method determines whether a valid heartbeat has been detected within a "heartbeat interval." In one example, the heartbeat interval is a defined interval of time measured from a last time that a state of the second SDN controller was updated, as discussed in greater detail below. The heartbeat interval may comprise a period of time that is longer than the time elapsed between queries made in step 204. For instance, the second SDN controller may be queried for the heartbeat every ten seconds, while the heartbeat interval is thirty seconds long. This gives the second SDN controller time, and potentially multiple opportunities, to respond with a heartbeat.

In one example, a heartbeat is considered "valid" if heartbeat signal contains no errors. In the case of the second SDN controller's BGP state, for instance, an error might comprise a "connection exception" response to the query, which indicates that a connection to the second SDN controller could not be established. An error might also comprise a "session state null" response, which indicates that a connection to the second SDN controller was established, but that the second SDN controller's BGP state was down. An error might also be detected by parsing the response from the second SDN controller and detecting that the indicated session state is not equal to the established session state, which would also indicate that a connection to the second SDN controller was established, but that the second SDN controller's BGP state was down.

If it is determined in step 206 that the heartbeat is detected within the heartbeat interval, then the method 200 proceeds to step 208 and updates the state of the SDN controller to indicate that it is healthy. In one example, the method maintains a table that tracks a path computation element (PCE) state and a border gateway protocol (BGP) state of the second SDN controller, and updating the state in step 206 involves updating the information in the table.

FIG. 3, for instance, illustrates one example of a table 300 for tracking an SDN controller's PCE state and BGP state. In particular, the example table 300 of FIG. 3 contains entries for tracking the PCE and BGP states for n different SDN controllers, identified by the host names ODL1-ODLn. As shown in FIG. 3, the table 300 may include a plurality of fields, including one or more of the following: PCE host name (which contains an identifier, such as ODL1, identifying the SDN controller associated with the entry); state (which contains an indication as to whether the associated SDN controller's state is "active" or "standby"); PCE state (which contains an indication as to whether the associated SDN controller's PCE state is "up" or "dead"); BGP state (which contains an indication as to whether the associated SDN controller's BGP state is "up" or "down"); precedence (which contains an indication as to whether the associated SDN controller is the "primary" or "secondary" controller); path computation client (PCC) precedence (which contains a value that indicates an order of precedence or priority when there are multiple "secondary" SDN controllers tracked in the table as set in PCCs); failover in progress (which contains an indication as to whether the associated SDN controller is in the process of failing over); session count (which contains a value, e.g., between zero and fifty, indicating a number of PCC sessions associated with the associated SDN controller); delegated count (which contains a value, e.g., between zero and 4,900, indicating a number of routers delegated to the associated SDN controller); update PCE (which contains the time at which, or a time elapsed since, the PCE state was last updated for the associated SDN controller); and update BGP (which contains the time at which, or a time elapsed since, the BGP state was last updated for the associated SDN controller).

Referring back to FIG. 2, if the heartbeat is detected in step 206 of the method 200, then the method may set the PCE state and/or the BGP state of the second SDN controller to "up" in step 208. Once the state of the second SDN controller has been updated, the method 200 returns to step 204, and the method proceeds as described above to wait for the next heartbeat.

If, however, it is determined in step 206 that the heartbeat is not detected within the heartbeat interval, then the method 200 proceeds to step 210. In step 210, the method updates the state of the SDN controller to indicate that it is not healthy. In this case, the method may set the PCE state and/or the BGP state of the second SDN controller to "dead" or "down." The method 200 then returns to step 204, and the method proceeds as described above to wait for the next heartbeat.

Thus, in summary, the method 200 determines that a monitored SDN controller is healthy if the monitored SDN controller: (1) provides a response to a query; (2) the response comprises an expected response; and (3) the response contains valid data. If any one or combination of these three conditions are not met for both the PCE and BGP states, then the monitored SDN controller may be determined to be unhealthy.

Figure 4:
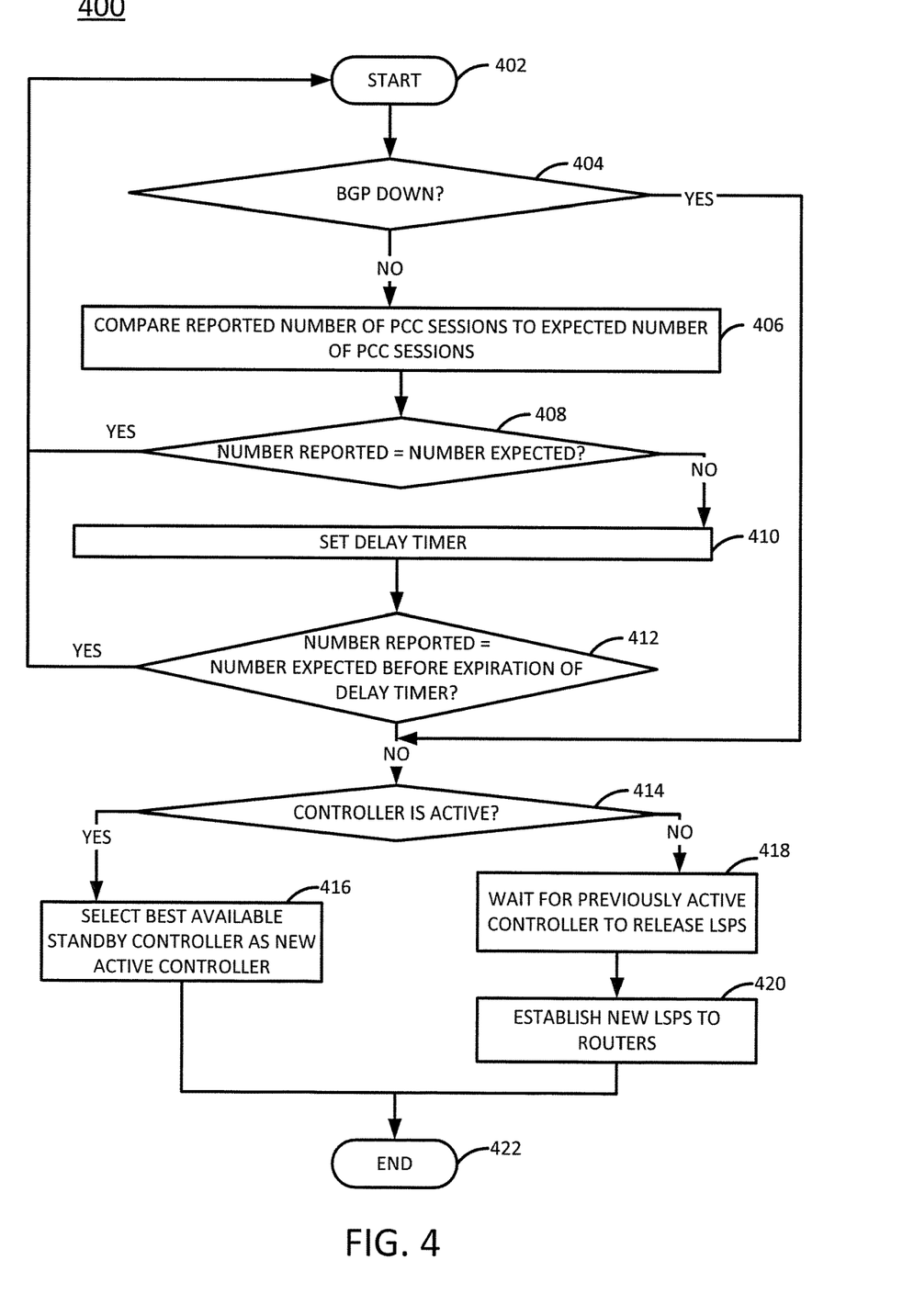
FIG. 4 illustrates a flowchart of an example method for determining when to perform a failover from a primary software defined networking controller to a secondary software defined networking controller, in accordance with the present disclosure.

FIG. 4 illustrates a flowchart of an example method 400 for determining when to perform a failover from a primary SDN controller to a secondary SDN controller, in accordance with the present disclosure. In one example, the steps, functions, or operations of the method 400 may be performed by an SDN controller, e.g., broadly a "device," or by an algorithm running on an NFVI host that hosts an SDN controller, such as any of the NFVI hosts 102 in FIG. 1. Alternatively, or in addition, in one example, the steps, functions, or operations of method 400 may be performed by a computing device or system 600, and/or processor 602 as described in connection with FIG. 6 below. For example, the processor 602 and memory 604 may represent the hardware logic and a memory storing computer/hardware logic-executable instructions of an example server, in accordance with the present disclosure.

For illustrative purposes, the method 400 is described in greater detail below in connection with a monitoring algorithm executing on a first NFVI host that hosts a first SDN controller, where the monitoring algorithm monitors a second SDN controller (which may or may not be hosted on a second NFVI host). The second SDN controller may be the primary and active SDN controller of FIG. 1, while the first SDN controller is a secondary and standby SDN controller of FIG. 1. Alternatively, the second SDN controller could be a secondary and standby SDN controller, while the first SDN controller is the primary and active SDN controller. As discussed above, the primary and secondary controllers will simultaneously monitor each other (or, more accurately, the NFVI hosts hosting the SDN controllers will run algorithms to monitor the other SDN controller) by performing the method 400.

The method 400 begins in step 402 and proceeds to step 404. In step 404, the method determines whether the BGP state of the second SDN controller is down. This may be determined, for example, in accordance with the method 200 described above. If it is determined in step 404 that the BGP state of the second SDN controller is down, then the method advances to step 414 to determine whether the first SDN controller is the active controller (i.e., the primary SDN controller).

If, however, it is determined in step 404 that the BGP state of the second SDN controller is not down, then the method 400 proceeds to step 406. In step 406, the method compares the number of path computation client (PCC) sessions reported by the second SDN controller (e.g., in the second SDN controller's heartbeat, as described above) to an expected number of PCC sessions. The number of PCC sessions reflects the number of network elements (e.g., routers, switches, etc.) that are controlled by the second SDN controller. Each PCC session may be associated with a path computation element (PCE) communication protocol (PCEP) connection that connects the second SDN controller to a controlled network element. The number of PCC sessions reported by the second SDN controller may be indicated in the session count field of the table 300 of FIG. 3 for the first SDN controller.

In one example, the expected number of PCC sessions may be derived from the most recent border gateway protocol-link state (BGP-LS) topology and may be determined by the method periodically (e.g., every "y" seconds, where "y" can be 300, 120, 60, 30, 15, 10 and so on).

In one example, the comparison performed in step 406 may be performed periodically (e.g., every "z" seconds, where "z" may be ten, forty, or another number). In another example, the comparison may be performed each time a heartbeat is detected.

In step 408, the method determines whether the reported number of PCC sessions matches the expected number of PCC sessions. In addition, the method may also determine whether the reported number of PCC sessions is fewer than a number of PCC sessions associated with the first SDN controller. If the reported number of PCC sessions is fewer than the expected number of PCC sessions (or fewer than the number of PCC sessions associated with the first SDN controller), for instance, this may indicate that at least one PCEP connection to the second SDN controller has been lost.

If it is determined in step 408 that the reported number of PCC sessions matches the expected number of PCC sessions, then the method 400 returns to beginning step 402 and the method proceeds as described above to continue comparing the number of reported PCC sessions to the expected number of PCC sessions, according to whatever schedule is employed for performing the comparison (e.g., a predefined time period, each time a heartbeat is detected, etc.).

If, however, it is determined in step 408 that the reported number of PCC sessions does not match the expected number of PCC sessions (and that the reported number of PCC sessions is fewer than the number of PCC sessions associated with the first SDN controller), then the method 400 proceeds to step 410. In step 410, the method sets a delay timer. The delay timer allows for network normalization (e.g., to account for the transient effects of dampening). For instance, if a network element connected to the second SDN controller is down, but the first SDN controller has not yet detected the loss of connectivity to this network element, this may account for a difference in the PCC sessions reported by the first and second SDN controllers. Delaying further action for a period of time will allow for the first SDN controller to "catch up."

The delay timer may count down a period of time or a number of cycles (where each cycle may last, for instance, for thirty seconds). In one example, the length of the delay may be determined by the difference in the number of PCEP connections reported by the second SDN controller and the expected number of PCEP connections, and may be adjusted dynamically based on the difference during each iteration of the method 400.

Figure 5:
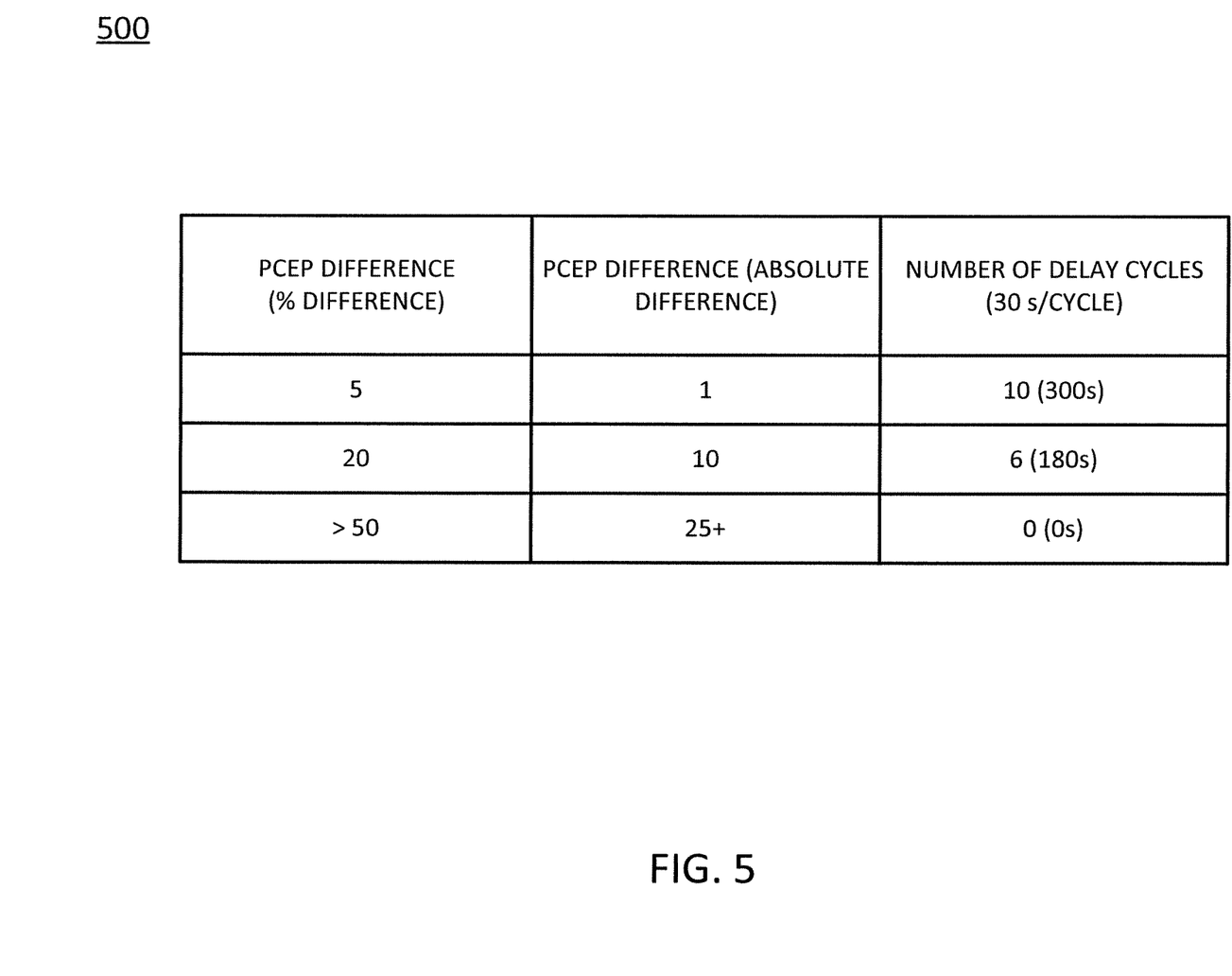
FIG. 5 illustrates one example of a table for computing a length of time for which to set a failover timer.

FIG. 5, for instance, illustrates one example of a table 500 for computing a length of time for which to set the failover timer. In particular, the example table 500 of FIG. 5 tracks the difference in the number of PCEP connections by both the percentage of difference (e.g., 5%, 20%, more than 50%, etc.) and by the absolute difference (e.g., 1 session, 10 sessions, more than 25 sessions, etc.). The number of delay cycles (where each delay cycle may last, for instance, thirty seconds, forty five seconds, etc.) varies depending upon the size of the difference in the number of PCEP connections. In one example, the number of delay cycles is inversely proportional to the size of the difference in the number of PCEP connections. For instance, the smaller the difference, the greater the number of delay cycles; the greater the difference, the fewer the number of delay cycles. A small difference is more likely to be a result of a transient network event than a large difference, which is more likely to be a result of a failure.

Referring back to FIG. 4, in step 412, the method verifies, upon expiration of the delay timer, whether the reported number of PCC sessions now matches the expected number of PCC sessions. As discussed above, transient network events may account for a temporary discrepancy in these numbers, and the discrepancy may resolve once the network normalizes.

If it is determined in step 412 that the reported number of PCC sessions now matches the expected number of PCC sessions, then method 400 may return to beginning step 402, and the method may proceed as described above to continue monitoring the number of PCC sessions associated with the first SDN controller.

If, however, it is determined in step 412 that the reported number of PCC sessions still does not match the expected number of PCC sessions, then method 400 may proceed to step 414. In step 414, the method determines whether the first SDN controller is the active controller (i.e., the primary SDN controller). This may be determined by consulting the "state" field in the table 300 for the first SDN controller.

If the method concludes in step 414 that the first SDN controller is the primary/active controller (which implies that the second SDN controller is the secondary/standby controller), then the method 400 proceeds to step 416. In step 416, the method selects or dynamically instantiates a the best available standby controller, if available, as the new active controller. That is, since the method has determined that the second SDN controller, which is currently the secondary/standby SDN controller, is not healthy (as reflected by the discrepancies in its reported PCC sessions), a new standby controller may be selected (e.g., from among a plurality of already running candidate SDN controllers) or instantiated (e.g., newly created). The method then ends in step 422.

If, however, the method concludes in step 414 that the first SDN controller is not the primary/active controller (i.e., the first SDN controller is the secondary/standby controller, which implies that the second SDN controller is the primary/active controller), then the method 400 proceeds to step 418. In step 418, the method waits for the second (e.g., previously active) SDN controller, which has been determined not to be healthy, to release the remaining LSPs to the routers so that the routers can be re-delegated to the first SDN controller. Thus, this implies that a failover has happened.

In one example, the second SDN controller may indicate that a failover is initiated by setting the flag in the "failover in progress" field of the table 300 of FIG. 3 to "true" and/or by setting its state to "standby." However, the second SDN controller may cancel the failover before the failover process is completed by setting the flag in the "failover in progress" field back to "false," which is the default setting when the number of the number of PCEP connections reported by the second SDN controller matches the expected number of PCEP connections. The second SDN controller may cancel the failover if the number of PCEP connections reported by the second SDN controller becomes equal to the expected number of PCEP connections. Thus, as indicated in step 418, the first SDN controller takes no action until the LSPs have been released by the second SDN controller. In one example, release of the LSPs may be delayed on the second SDN controller side until the first SDN controller's state is set to "active."

Once the LSPs have been released by the second (e.g., standby) SDN controller, the method 400 proceeds to step 420. In step 420, the method establishes, on behalf of the first SDN controller, a plurality of LSPs to the routers that have been released by the second SDN controller. In addition, the method may set the "precedence" field for the second SDN controller to "primary" and the "precedence" field for the first SDN controller may be set to "secondary" at this time (where PCC precedence may be a round robin method for determining which SDN controller should get control next). The method then ends in step 422.

In the event that a failover to a secondary SDN controller occurs, the secondary SDN controller may, upon becoming the primary SDN controller, select or instantiate a new secondary SDN controller (rather than selecting the former primary SDN controller, which has been determined to be unhealthy by the secondary SDN controller). The new secondary SDN controller will run all of the same health monitoring methods (described above in connection with FIGS. 2 and 4) as previously performed by the primary SDN controller.

It should be noted that although not specifically specified, one or more steps, functions or operations of the methods 200 or 400 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 2 or FIG. 4 that recite a determining operation or involve a decision do not necessarily require that both branches of the determining operation be practiced. In other words, one of the branches of the determining operation can be deemed as an optional step. In addition, one or more steps, blocks, functions, or operations of the above described methods 200 or 400 may comprise optional steps, or can be combined, separated, and/or performed in a different order from that described above, without departing from the example embodiments of the present disclosure.

FIG. 6 depicts a high-level block diagram of a computing device suitable for use in performing the functions described herein. As depicted in FIG. 6, the system 600 comprises one or more hardware processor elements 602 (e.g., a central processing unit (CPU), a microprocessor, or a multi-core processor, hardware logic, and so forth), a memory 604 (e.g., random access memory (RAM) and/or read only memory (ROM)), a module 605 for monitoring the state and health of a centralized SDN controller, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the methods 200 or 400 as discussed above are implemented in a distributed or parallel manner for a particular illustrative example, i.e., the steps of the methods, or the entire methods are implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device, or any other hardware equivalents, e.g., computer readable instructions pertaining to the methods discussed above can be used to configure a hardware processor to perform the steps, functions and/or operations of the above disclosed methods 200 or 400. In one example, hardware processor element 602 may function as a server of the present disclosure when used in conjunction with computer/hardware logic-executable code or instructions. For instance, instructions and data for the present module or process 605 for monitoring the state and health of a centralized SDN controller (e.g., a software program comprising computer-executable instructions) can be loaded into memory 604 and executed by hardware processor element 602 to implement the steps, functions or operations as discussed above in connection with the illustrative methods 200 or 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 605 for monitoring the state and health of a centralized SDN controller (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a disclosed embodiment should not be limited by any of the above-described exemplary embodiments, but should be defined only in accordance with the following claims and their equivalents.

What is claimed is:

1. A method comprising:
    detecting, by a processor of a standby software defined networking controller, when a number of path computation client sessions reported by an active software defined networking controller fails to match an expected number;
    verifying, by the processor after expiration of a predefined delay implemented after the detecting, that the number of path computation client sessions reported by the active software defined networking controller still fails to match the expected number; and
    assuming, by the processor after the verifying, a role of the active software defined networking controller.

2. The method of claim 1, wherein the detecting comprises:
    querying, by the processor, the active software defined networking controller for a heartbeat;
    parsing, by the processor, the heartbeat for the number of path computation client sessions reported by the active software defined networking controller; and
    comparing, by the processor, the number of path computation client sessions reported by the active software defined networking controller to the expected number.

3. The method of claim 2, wherein the expected number is derived from path computation sessions and a most recent border gateway protocol-link state topology of a network controlled by the active software defined networking controller.

4. The method of claim 1, wherein a length of the predefined delay is computed based on a size of a difference between the number of path computation client sessions reported by the active software defined networking controller and the expected number.

5. The method of claim 4, wherein the length of the predefined delay is inversely proportional to the size of the difference.

6. The method of claim 1, wherein the assuming comprises:
establishing, by the processor, upon a release of a plurality of routers by the active software defined networking controller, a plurality of label-switched paths to the plurality of routers, so that the standby software defined networking controller becomes a new active software defined networking controller.

7. The method of claim 6, further comprising:
selecting, by the new active software defined networking controller, a new standby software defined networking controller from a plurality of candidate software defined networking controllers.

8. The method of claim 6, further comprising:
instantiating, by the new active software defined networking controller, the new standby software defined networking controller.

9. The method of claim 1, further comprising:
detecting, by the processor, and prior to the detecting when the number of path computation client sessions reported by the active software defined networking controller fails to match the expected number, that a border gateway protocol state of the active software defined networking controller is down.

10. The method of claim 9, wherein the detecting that the border gateway protocol state of the active software defined networking controller is down comprises:
querying, by the processor, the active software defined networking controller for a heartbeat; and
parsing the heartbeat for the border gateway protocol state.

11. The method of claim 9, wherein the detecting that the border gateway protocol state of the active software defined networking controller is down comprises:
querying, by the processor, the active software defined networking controller for a heartbeat; and
determining, by the processor, that no heartbeat is received from the active software defined networking controller within a predefined interval.

12. The method of claim 1, wherein while the processor is performing the detecting, the verifying, and the assuming, the active software defined networking controller is detecting a number of path computation client sessions reported by the processor, comparing the number of path computation client sessions reported by the processor to the expected number, and verifying that the number of path computation client sessions reported by the processor fails to match the expected number after the expiration of the predefined delay.

13. The method of claim 1, wherein a network function virtualization infrastructure host comprises the processor of the standby software defined networking controller, wherein the detecting, the verifying, and the assuming are performed by an algorithm running on the network function virtualization infrastructure host that hosts the standby software defined networking controller.

14. A non-transitory computer-readable medium storing instructions which, when executed by a processor of a standby software defined networking controller, cause the processor to perform operations, the operations comprising:
detecting when a number of path computation client sessions reported by an active software defined networking controller fails to match an expected number;
verifying, after expiration of a predefined delay implemented after the detecting, that the number of path computation client sessions reported by the active software defined networking controller still fails to match the expected number; and
assuming, after the verifying, a role of the active software defined networking controller.

15. The non-transitory computer-readable medium of claim 14, wherein the detecting comprises:
querying the active software defined networking controller for a heartbeat;
parsing the heartbeat for the number of path computation client sessions reported by the active software defined networking controller; and
comparing the number of path computation client sessions reported by the active software defined networking controller to the expected number.

16. The non-transitory computer-readable medium of claim 14, wherein a length of the predefined delay is computed based on a size of a difference between the number of path computation client sessions reported by the active software defined networking controller and the expected number.

17. The non-transitory computer-readable medium of claim 16, wherein the length of the predefined delay is inversely proportional to the size of the difference.

18. The non-transitory computer-readable medium of claim 14, wherein the assuming comprises:
establishing, upon a release of a plurality of routers by the active software defined networking controller, a plurality of label-switched paths to the plurality of routers, so that the standby software defined networking controller becomes a new active software defined networking controller.

19. The non-transitory computer-readable medium of claim 18, further comprising:
selecting a new standby software defined networking controller.

20. A device comprising:
a processor; and
a computer-readable medium storing instructions which, when executed by the processor, cause the processor to perform operations, the operations comprising:
detecting when a number of path computation client sessions reported by an active software defined networking controller fails to match an expected number;
verifying, after expiration of a predefined delay implemented after the detecting, that the number of path computation client sessions reported by the active software defined networking controller still fails to match the expected number; and
assuming, after the verifying, a role of the active software defined networking controller.

* * * * *